US012033800B2

(12) United States Patent
Yoo et al.

(10) Patent No.: US 12,033,800 B2
(45) Date of Patent: Jul. 9, 2024

(54) CAPACITOR COMPONENT AND METHOD FOR MANUFACTURING SAME

(71) Applicant: SAMSUNG ELECTRO-MECHANICS CO., LTD., Suwon-si (KR)

(72) Inventors: Jong Hoon Yoo, Suwon-si (KR); Su Been Kim, Suwon-si (KR); Kyung Ryul Lee, Suwon-si (KR); Jong Suk Jeong, Suwon-si (KR); Chun Hee Seo, Suwon-si (KR); Dong Geon Yoo, Suwon-si (KR); Hyung Jun Kong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 86 days.

(21) Appl. No.: 17/713,702

(22) Filed: Apr. 5, 2022

(65) Prior Publication Data

US 2023/0145889 A1 May 11, 2023

(30) Foreign Application Priority Data

Nov. 11, 2021 (KR) ........................ 10-2021-0154816

(51) Int. Cl.
*H01G 4/12* (2006.01)
*H01G 4/008* (2006.01)
*H01G 4/30* (2006.01)

(52) U.S. Cl.
CPC ......... *H01G 4/1227* (2013.01); *H01G 4/0085* (2013.01); *H01G 4/30* (2013.01)

(58) Field of Classification Search
None
See application file for complete search history.

(56) References Cited

U.S. PATENT DOCUMENTS

| 11,710,601 | B2* | 7/2023 | Yamada | H01G 4/232 |
| | | | | 361/321.2 |
| 2013/0321978 | A1* | 12/2013 | Lee | H01G 4/1227 |
| | | | | 361/301.4 |
| 2019/0057813 | A1* | 2/2019 | Okamoto | H01G 4/1227 |
| 2020/0027660 | A1* | 1/2020 | Chun | H01G 4/232 |
| 2022/0223344 | A1* | 7/2022 | Jung | H01G 4/012 |
| 2022/0301770 | A1* | 9/2022 | Lee | H01G 4/30 |
| 2022/0301771 | A1* | 9/2022 | Suemasa | H01G 4/012 |

(Continued)

FOREIGN PATENT DOCUMENTS

| JP | 4759584 B2 * | 8/2011 | ............... H01G 4/40 |
| JP | 2014-145117 A | 8/2014 | |

(Continued)

*Primary Examiner* — Dion R. Ferguson
(74) *Attorney, Agent, or Firm* — Morgan, Lewis & Bockius LLP (57) ABSTRACT

According to an aspect of the present disclosure, a capacitor component includes a body including a dielectric layer and an internal electrode layer; and an external electrode disposed on the body and connected to the internal electrode layer, wherein the body further includes a withstand voltage layer disposed in a region spaced apart by more than 0 to 30 nm or less in a direction from a boundary of the internal electrode layer toward the dielectric layer, and having ionic mobility, lower than ionic mobility of the dielectric layer.

20 Claims, 2 Drawing Sheets

(56) References Cited

U.S. PATENT DOCUMENTS

| | | | | |
|---|---|---|---|---|
| 2023/0005664 A1* | 1/2023 | Kang | ........................ | H01G 4/30 |
| 2023/0135292 A1* | 5/2023 | Kang | ................... | H01G 4/0085 |
| | | | | 361/301.4 |
| 2023/0145889 A1* | 5/2023 | Yoo | ...................... | H01G 4/1227 |
| | | | | 361/301.4 |

FOREIGN PATENT DOCUMENTS

| KR | 10-2013-0136760 A | | 12/2013 |
|---|---|---|---|
| KR | 20190121224 A | * | 10/2019 |
| KR | 10-2020-0009519 A | | 1/2020 |
| KR | 20220137247 A | * | 10/2022 |

* cited by examiner

CAPACITOR COMPONENT AND METHOD FOR MANUFACTURING SAME

CROSS-REFERENCE TO RELATED APPLICATION(S)

This application claims benefit of priority to Korean Patent Application No. 10-2021-0154816 filed on Nov. 11, 2021 in the Korean Intellectual Property Office, the disclosure of which is incorporated herein by reference in its entirety.

TECHNICAL FIELD

The present disclosure relates to a capacitor component and a method for manufacturing the capacitor component.

BACKGROUND

A multilayer ceramic capacitor (MLCC), a capacitor component, is an important chip component used in industries such as the communications, computing, home appliance, automotive, and other industries, due to their small size, high capacity, and ease of mounting, and, in particular, are a key passive element used in various electric, electronic, and information communication devices such as mobile phones, computers, digital TVs, and the like.

In general, the MLCC may be manufactured by screen-printing a conductive paste for forming an internal electrode layer on a dielectric green sheet, providing and stacking the dielectric green sheet on which the conductive paste is printed as a plurality of dielectric green sheets, and pressing the plurality of stacked dielectric green sheets to form a stack body, and sintering the stack body. The conductive paste may generally be prepared by mixing a conductive powder such as nickel (Ni) or the like, a ceramic powder, a binder, a solvent, and the like.

As a thickness of a dielectric layer decreases, movement of ions expressed by oxygen vacancies or the like becomes easier, and the dielectric layer becomes semiconductor, and as a result, reliability of components may be deteriorated.

SUMMARY

An aspect of the present disclosure is to provide a capacitor component capable of securing reliability even when a dielectric layer is thinned.

According to an aspect of the present disclosure, a capacitor component includes a body including a dielectric layer and an internal electrode layer; and an external electrode disposed on the body and connected to the internal electrode layer, wherein the body further includes a withstand voltage layer disposed in a region spaced apart by more than 0 to 30 nm or less in a direction from a boundary of the internal electrode layer toward the dielectric layer, and having ionic mobility, lower than ionic mobility of the dielectric layer.

According to an aspect of the present disclosure, a capacitor component includes a body including a dielectric layer and a plurality of internal electrode layers alternately disposed with each other, with the dielectric layer interposed therebetween; and an external electrode disposed on the body and connected to the plurality of internal electrode layers, wherein the dielectric layer has a first region and a second region, the second region disposed between the first region and at least one of the plurality of internal electrode layers, and the second region extends from the at least one of the plurality of internal electrode layers by more than 0 to 30 nm or less in a direction from a boundary with the internal electrode layers to the first region, and wherein the second region of the dielectric layer comprises at least one of Zn and In, and wherein ionic mobility of the second region of the dielectric layer is lower than ionic mobility of the first region of the dielectric layer.

According to an aspect of the present disclosure, a capacitor component includes a body including a dielectric layer and a plurality of internal electrode layers alternately disposed with each other, with the dielectric layer interposed therebetween; and an external electrode disposed on the body and connected to the plurality of internal electrode layers, wherein the dielectric layer has a first region and a second region, the second region disposed between the first region and at least one of the plurality of internal electrode layers, and the second region extends from the at least one of the plurality of internal electrode layers by more than 0 to 30 nm or less in a direction from a boundary with the internal electrode layers to the first region, wherein the second region of the dielectric layer comprises dielectric ceramic particles in which at least a portion of titanium (Ti) is substituted with at least one of tin (Sn) and zirconium (Zr), and wherein ionic mobility of the second region of the dielectric layer is lower than ionic mobility of the first region of the dielectric layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a gravity direction.

The term "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, a first direction may be defined as a Z-direction or a thickness direction, a second direction may be defined as an X-direction or a length direction, and a third direction may be defined as a Y-direction or a width direction.

Hereinafter, a capacitor component according to an embodiment of the present disclosure will be described in detail with reference to the accompanying drawings. Referring to the accompanying drawings, the same or corresponding components may be denoted by the same reference numerals, and overlapped descriptions will be omitted.

Figure 1:
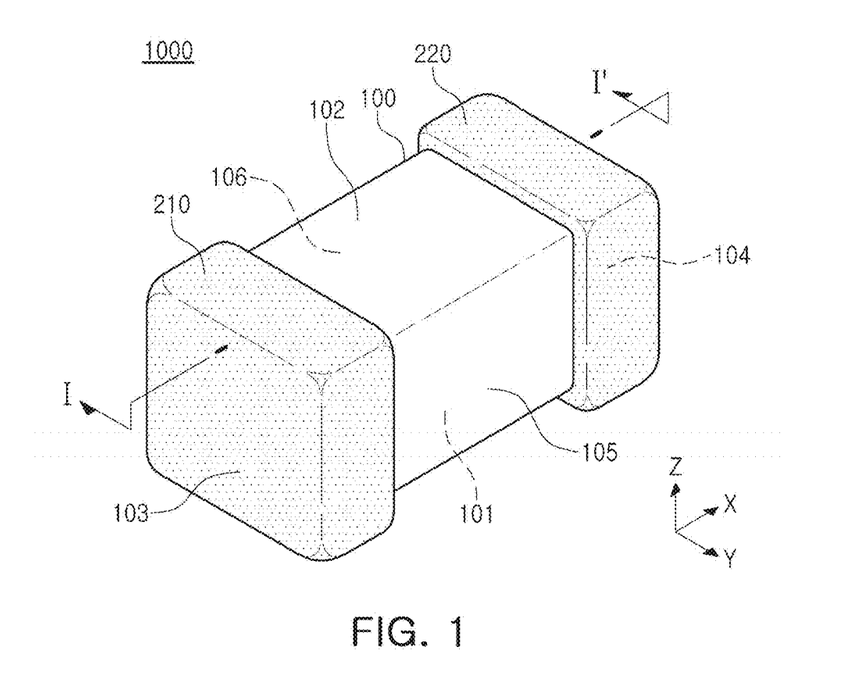
FIG. 1 is a perspective view schematically illustrating a capacitor component according to an embodiment of the present disclosure.
Figure 2:
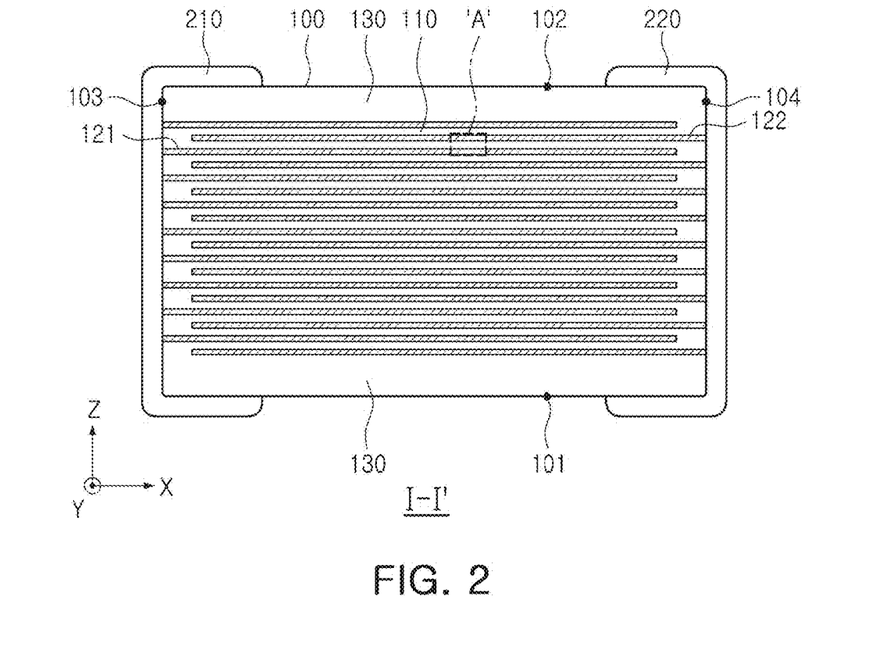
FIG. 2 is a view schematically illustrating a cross-section of FIG. 1, taken along line I-I'.
Figure 3:
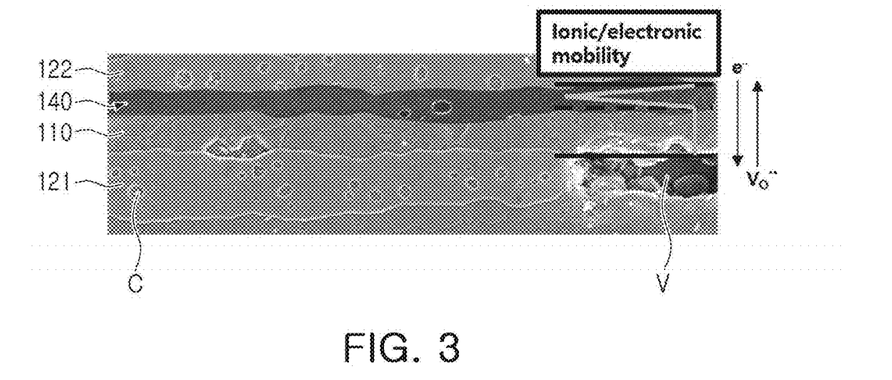
FIG. 3 shows an SEM image of portion A of FIG. 2.

FIG. 1 is a perspective view schematically illustrating a capacitor component according to an embodiment of the present disclosure. FIG. 2 is a view schematically illustrating a cross-section of FIG. 1, taken along line I-I'. FIG. 3 shows an SEM image of portion A of FIG. 2.

Referring to FIGS. 1 to 3, a capacitor component 1000 according to the present embodiment may include a body 100 and external electrodes 210 and 220. In the present embodiment, the body 100 may include a dielectric layer 110, internal electrode layers 121 and 122, a cover layer 130, and a withstand voltage layer 140.

The body 100 may form an exterior of the capacitor component 1000 according to the present embodiment. Although a specific shape of the body 100 is not particularly limited, as illustrated, the body 100 may have a hexahedral shape or a shape similar thereto. Due to shrinkage of a ceramic powder included in the body 100 during a sintering process, the body 100 may not have a hexahedral shape having perfectly straight lines, but may have a substantially hexahedral shape.

Based on FIGS. 1 and 2, the body 100 may include a first surface 101 and a second surface 102 opposing each other in a thickness direction (Z), a third surface 103 and a fourth surface 104 opposing each other in a length direction (X), and a fifth surface 105 and a sixth surface 106 opposing each other in a width direction (Y). Each of the third to sixth surfaces 103, 104, 105, and 106 of the body 100 may be a wall surface of the body 100 connecting the first surface 101 and the second surface 102 of the body 100. Hereinafter, both end surfaces (one end surface and the other end surface) of the body 100 may refer to the third surface 103 and the fourth surface 104 of the body 100, respectively, and both side surfaces (one side surface and the other side surface) of the body 100 may refer to the fifth surface 105 and the sixth surface 106 of the body 100, respectively. In addition, one surface and the other surface of the body 100 may refer to the first surface 101 and the second surface 102 of the body 100, respectively. The one surface 101 of the body 100 may be used as a mounting surface, when the capacitor component 1000 according to the present embodiment is mounted on a mounting substrate such as a printed circuit board or the like.

The body 100 may include a dielectric layer 110 and first and second internal electrode layers 121 and 122, alternately arranged, with the dielectric layer 110 interposed therebetween. The dielectric layer 110, the first internal electrode layer 121, and the second internal electrode layer 122 may be formed as a plurality of layers. Hereinafter, the first and second internal electrode layers 121 and 122 will be collectively referred to as internal electrode layers 121 and 122, except for a case in which distinction is required. Therefore, a description of a portion commonly referred to as the internal electrode layers 121 and 122 may be commonly applied to the first and second internal electrode layers 121 and 122.

A plurality of dielectric layers 110 forming the body 100 may be provided in a sintered state, and a boundary between adjacent dielectric layers 110 may be integrated to the extent that it may be difficult to check without using a scanning electron microscope (SEM).

A raw material for forming the dielectric layer 110 is not particularly limited as long as it may obtain sufficient capacitance, and may be, for example, barium titanate ($BaTiO_3$) powder. As a material for forming the dielectric layer 110, various ceramic additives, organic solvents, plasticizers, binders, dispersants, or the like may be added to powder such as barium titanate ($BaTiO_3$) powder or the like according to the purpose of the present disclosure.

A thickness of the dielectric layer 110 may be 400 nm or less, preferably 380 nm or less, and more than 0. When the thickness of the dielectric layer 110 exceeds 400 nm, it may be disadvantageous in reducing an overall thickness of the component. In addition, when the thickness of the dielectric layer 110 exceeds 400 nm, assuming the same thickness of the component, thicknesses of the internal electrode layers 121 and 122 should be reduced. Therefore, connectivity of the internal electrode layers 121 and 122 may be deteriorated to reduce capacitance.

A thickness of the dielectric layer 110 may be measured using an optical image or an SEM image obtained by scanning an X-Z cross-section in which the capacitor component is cut in a central portion in the width direction (Y). For example, a thickness of the dielectric layer 110 may refer to an arithmetic mean value by selecting one of the dielectric layers 110 illustrated in the image, and measuring a dimension in the Z-direction of the selected one dielectric layer 110 multiple times in the X-direction. The plurality of measurements in the X-direction may be performed at equal intervals in the X-direction, but are not limited thereto. In addition, the thickness of the dielectric layer 110 may refer to those obtained by calculating a thickness of each of the dielectric layers 110 by the above-described method for each of the plurality of dielectric layers 110 illustrated in the image, and dividing by the total number of the dielectric layers 110 illustrated in the image.

The cover layer 130 may be disposed on and below the body 100, e.g., both end portions in the thickness direction (in the Z-direction). The cover layer 130 may serve to maintain reliability of the capacitor component against external impacts. The cover layer 130 may be formed using a material for forming the dielectric layer 110 or a material, different from the material for forming the dielectric layer 110. For example, in the latter case, the material for forming the dielectric layer 110 and the material for forming the cover layer 130 may be different from each other in terms of at least one of a composition, size, amount, or a dispersion degree of ceramic particles in each of the materials, or may be different from each other in terms of at least one of a composition, size, amount, or a dispersion degree of sub-elements in each of the materials.

The internal electrode layers 121 and 122 may be alternately arranged with the dielectric layer 110, and may include first and second internal electrode layers 121 and 122. The first and second internal electrode layers 121 and 122 may be alternately arranged to oppose each other, with the dielectric layer 110 interposed therebetween, and may be exposed from the third and fourth surfaces 103 and 104 of the body 100, respectively. The internal electrode layers 121 and 122 may entirely have a shape similar to a plate shape.

The internal electrode layers 121 and 122 may be alternately exposed from the third surface 103 and the fourth surface 104 of the body 100 that may be both end surfaces in the length direction X, and may be connected to the first and the second external electrodes 210 and 220, respectively. For example, the first internal electrode layer 121 may be exposed from the third surface 103 of the body 100, to be connected to the first external electrode 210, and may not be exposed from the fourth surface 104 of the body 100, not to be connected to the second external electrode 220. The second internal electrode layer 122 may be exposed from the fourth surface 104 of the body 100, to be connected to the second external electrode 220, and may not be exposed from the third surface 103 of the body 100, to not be connected to the first external electrode 210. Therefore, the first internal electrode layer 121 may be spaced apart from the fourth surface 104 of the body 100 by a predetermined distance, and the second internal electrode layer 122 may be spaced apart from the third surface 103 of the body 100 by a predetermined distance. In this case, the internal electrode layers 121 and 122 may be electrically separated from each other by the dielectric layer 110 interposed therebetween.

The internal electrode layers 121 and 122 may include, for example, one or more conductors of palladium (Pd), silver (Ag), nickel (Ni), and copper (Cu). For example, the internal electrode layers 121 and 122 may be formed by stacking a conductive paste including a conductive powder including nickel (Ni), a binder, a solvent, and the like, on a dielectric green sheet and then sintering the same. The internal electrode layers 121 and 122 may include nickel (Ni).

The internal electrode layers 121 and 122 may have a thickness of 10 nm or more and 500 nm or less, respectively. When the thickness of each of the internal electrode layers 121 and 122 is less than 10 nm, connectivity of the internal electrode layers 121 and 122 may be deteriorated, to reduce capacitance thereof. When the thickness of each of the internal electrode layers 121 and 122 is greater than 500 nm, it may be difficult to achieve electrical insulation between the internal electrode layers 121 and 122, because a dielectric layer 110 having a thin thickness is formed, based on a component having the same size.

A thickness of each of the internal electrode layers 121 and 122 may be measured using an optical image or an SEM image obtained by scanning an X-Z cross-section in which the capacitor component is cut in a central portion in the width direction (Y). For example, a thickness of each of the internal electrode layers 121 and 122 may refer to an arithmetic mean value by selecting one of each of the internal electrode layers 121 and 122 illustrated in the image, and measuring multiple times in the X-direction a dimension in the Z-direction of the selected one internal electrode layer. The plurality of measurements in the X-direction may be performed at equal intervals in the X-direction, but are not limited thereto. In addition, a thickness of each of the internal electrode layers 121 and 122 may refer that thicknesses of each of the internal electrode layers 121 and 122 illustrated in the image are obtained by the above-described method, and a sum of the thicknesses may be divided by the total number of each of the internal electrode layers 121 and 122 illustrated in the image.

A ceramic particle C may be disposed in the internal electrode layers 121 and 122. The ceramic particle C may be formed by ceramic powder, such as barium titanate (BaTiO$_3$) or the like, additionally added to the conductive paste for forming the internal electrode layer. The ceramic particle C may be made of a barium titanate-based material in the same manner as a dielectric of the dielectric layer 110, and in this case, reliability of the capacitor component according to the present embodiment may be improved. A void V may be formed in the internal electrode layers 121 and 122. The void V may be formed due to diffusion and recrystallization in the sintering process of conductive powder particles included in the conductive paste, may be formed by removing an organic material, such as a solvent or the like, included in the conductive paste during the sintering process, or may be formed by diffusing ceramic powder particles included in the conductive paste into the dielectric layer 110 and/or a withstand voltage layer 140 to be described later during the sintering process. In addition, since a size of the void V is similar to a thickness of each of the internal electrode layers 121 and 122, the void V may be disposed to form a hole passing through each of the internal electrode layers 121 and 122. At least a portion of a material constituting the dielectric layer 110 and/or the withstand voltage layer 140 may be disposed in the hole.

The withstand voltage layer 140 may be disposed between the dielectric layer 110 and the internal electrode layers 121 and 122, and may have ionic mobility lower than ionic mobility of the dielectric layer 110. In this specification, the withstand voltage layer 140 may be defined as a region up to 20 nm or as a region up to 30 nm in the thickness direction from a boundary of the internal electrode layers 121 and 122 in the thickness direction, and a region exceeding the corresponding range may be defined as the dielectric layer 110. In addition, the withstand voltage layer 140 may be expressed as a portion of the dielectric layer. For example, the dielectric layer 110, mentioned above, may be defined as a central region of a dielectric layer that may be a portion of the dielectric layer, and the withstand voltage layer 140, mentioned above, may be defined as an upper region of a dielectric layer or a lower region of the dielectric layer that may be a portion of the dielectric layer. Hereinafter, for convenience of description, the withstand voltage layer 140 and the dielectric layer 110 will be separately distinguished.

In general, a thickness of a dielectric layer should be gradually reduced according to miniaturization and high capacity of a capacitor component, and it may be necessary to control a composition of the dielectric layer, e.g., to develop a new dielectric material to realize high reliability of the component and sufficient capacity in a user environment. In addition, as the thickness of the dielectric layer decreases, a ratio of grain boundaries having relatively excellent insulation resistance may decrease, and therefore, ion mobility represented by oxygen vacancy may increase in the dielectric layer. When ion mobility increases in the dielectric layer interposed between adjacent internal electrode layers, movement of oxygen vacancies into the dielectric layer may be facilitated, which may cause a problem in which the dielectric layer becomes semiconductor. In the present embodiment, the withstand voltage layer 140 having ionic mobility, lower than ionic mobility of the dielectric layer 110, may be disposed between the dielectric layer 110 and the internal electrode layers 121 and 122, to prevent oxygen vacancies from moving into the dielectric layer 110 and/or from moving to an outside of the dielectric layer 110. Due to a relatively low ion mobility of the withstand voltage layer 140, movement of oxygen vacancies may be reduced, and an electric field applied to the dielectric layer 110 may be primarily offset. Therefore, even when the dielectric layer 110 is thinned, reliability of a component may be guaranteed on a certain level. The ion mobility represented by oxygen vacancy may be qualitatively measured by measuring the concentration of oxygen vacancies using Raman, XPS, EPR, Rutherford back scattering, Mott-Schottky impedance spectroscopy, and other methods known to one of ordinary skill in the art.

Referring to FIG. 3, the withstand voltage layer 140 applied to the capacitor component 1000 according to an exemplary embodiment may include at least one of zinc (Zn) or indium (In).

For example, the withstand voltage layer 140 applied to the present embodiment may be prepared by forming a layer containing at least one of ZnO or $In_2O_3$ on a dielectric green sheet for a dielectric layer by sputtering, printing a conductive paste for an internal electrode layer on the formed layer, stacking the dielectric green sheet in plural to prepare a stack body, and sintering the stack body. ZnO and $In_2O_3$ may be materials having a relatively low ion mobility of oxygen vacancies, and may prevent oxygen vacancies from moving into a dielectric layer 110 and/or from moving to an outside of the dielectric layer 110 during a manufacturing process. Therefore, the withstand voltage layer 140 applied to the present embodiment may contain at least one of zinc (Zn) or indium (In).

The withstand voltage layer 140 may be disposed on at least one of a plurality of interfaces between the internal electrode layers 121 and 122 and the dielectric layer 110. For example, the withstand voltage layer 140 may be disposed on each of the plurality of interfaces between the internal electrode layers 121 and 122 and the dielectric layer 110, but the scope of the present disclosure is not limited thereto.

A thickness of the withstand voltage layer 140 may be 10 nm or more and 30 nm or less. When the thickness of the withstand voltage layer 140 is less than 10 nm, the effect of offsetting an electric field, described above, may be insignificant. When the thickness of the withstand voltage layer 140 is greater than 30 nm, an effective electric field applied to the dielectric layer 110 may be reduced, such that it may be difficult to implement capacitance. The thickness of the withstand voltage layer 140 may be measured using an optical image or an SEM image obtained by scanning an X-Z cross-section in which the capacitor component is cut in a central portion in the width direction (Y). For example, the thickness of the withstand voltage layer 140 may refer to an arithmetic mean value by selecting one of the withstand voltage layers 140 illustrated in the image, and measuring multiple times in the X-direction a dimension in the Z-direction of the selected one withstand voltage layer 140. The plurality of measurements in the X-direction may be performed at equal intervals in the X-direction, but are not limited thereto. In addition, the thickness of the withstand voltage layer 140 may refer that thicknesses of withstand voltage layers 140 illustrated in the image are obtained by the above-described method, and a sum of the thicknesses may be divided by the total number of the withstand voltage layers 140 illustrated in the image.

In the present embodiment, at least one of zinc (Zn) or indium (In) in the withstand voltage layer 140 may be contained in an amount of 1 at % or more and 10 at % or less. When the amount is less than 1 at %, the effect of offsetting an electric field, described above, of the withstand voltage layer 140 may be insignificant. When the amount is more than 10 at %, bonding force between the internal electrode layers 121 and 122 and the withstand voltage layer 140 may be reduced to deteriorate reliability.

The presence of Zn and In included in the withstand voltage layer 140 may be determined through SEM-EDS or TEM line profile analysis. Specifically, as illustrated in FIG. 3, when SEM-EDS is performed in a region up to 30 nm externally from a boundary of each of the internal electrode layers 121 and 122 in the thickness direction, in the X-Z cross-section in the length direction (X)-thickness direction (Z), taken from the central portion in the width direction (Y), for example, it can be seen that the region includes zirconium (Zr) and/or indium (In) elements, and an amount thereof is also contained therein.

Figure 4:
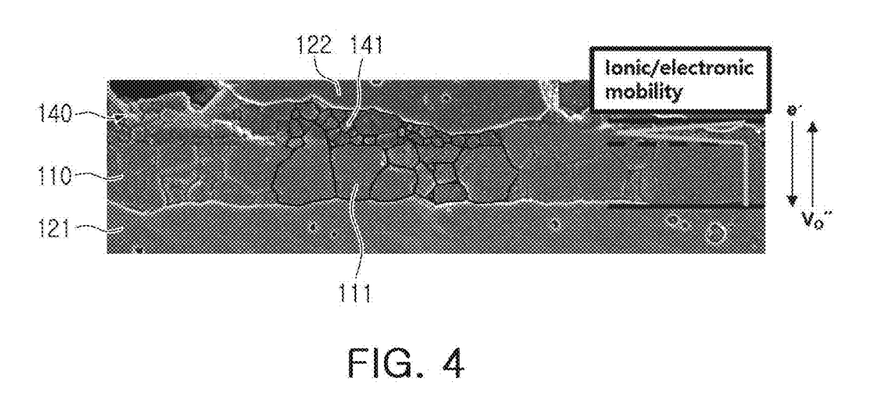
FIG. 4 is a view corresponding to FIG. 3 for a capacitor component according to another embodiment.

FIG. 4 is a view corresponding to FIG. 3 for a capacitor component according to another embodiment. In the following description of the capacitor component according to another embodiment with reference to FIG. 4, only the configuration of the withstand voltage layer 140 different from that of FIG. 3 will be described. Therefore, the explanations described with reference to FIG. 3 may be directly applied to a definition, a thickness, and the like of a withstand voltage layer 140, which are not described below.

Referring to FIG. 4, a withstand voltage layer 140 according to another embodiment of the present disclosure may have a composition of dielectric ceramic particles, similar to a composition of dielectric ceramic particles included in a dielectric layer 110, but an average size of dielectric ceramic particles 141 of the withstand voltage layer 140 may be smaller than an average size of dielectric ceramic particles 111 of the dielectric layer 110. Hereinafter, the dielectric ceramic particles may be used to mean dielectric ceramic crystal grains (grains), but the scope of the present disclosure is not limited thereto.

The average size of the dielectric ceramic particles 141 of the withstand voltage layer 140 may be 20% or more and 50% or less of the average size of the dielectric ceramic particles 111 of the dielectric layer 110. When the ratio is less than 20%, bonding force between the withstand voltage layer 140 and each of the internal electrode layers 121 and 122 and bonding force between the withstand voltage layer 140 and the dielectric layer 110 may be reduced to deteriorate reliability of a component. When the ratio is more than 50%, a ratio of a grain boundary may be lowered, such that the effect of offsetting an electric field, described above, of the withstand voltage layer 140 may be insignificant.

In this case, a size of each of the dielectric ceramic particles 111 and 141 may be measured using an SEM image or a TEM image of an X-Z cross-section in which the capacitor component is cut in a central portion in the width direction (Y). For example, a size of each of the grains 141 of the withstand voltage layer 140 may be a size obtained by selecting a withstand voltage layer 140, which is a region spaced apart by 30 nm in a direction from a boundary of each of the internal electrode layers 121 and 122, among the withstand voltage layers 140, in the image, measuring a dimension of a major axis and a dimension of a minor axis for all plurality of grains appearing in the selected withstand voltage layer 140, and selecting values corresponding to 50% of the dimensions, respectively. Alternatively, a size of each of the grains 141 of the withstand voltage layer 140 may refer to a size obtained by calculating a size of each of the grains in each of the withstand voltage layers 140 by the method described above for each of the plurality of withstand voltage layers 140 illustrated in the image, and dividing by the total number of withstand voltage layers 140 illustrated in the image. The description of the above-described method for measuring the size of each of the dielectric ceramic particles 141 of the dielectric layer 140 may be equally applied to a method of measuring a size of each of the dielectric ceramic particles 111 of the dielectric layer 110.

For example, each of the withstand voltage layer 140 and the dielectric layer 110 may include dielectric ceramic grains including barium (Ba) and titanium (Ti). The withstand voltage layer 140 may include dielectric ceramic particles in which at least a portion of titanium (Ti) is substituted with at least one of tin (Sn) or zirconium (Zr), expressed as BaTi$_{1-x}$(Sn and/or Zr)$_x$O$_3$ (where x is 0.2 or more and 0.5 or less). For example, the withstand voltage layer 140 may include dielectric ceramic grains in which at least a portion of titanium (Ti) in BaTiO$_3$ is substituted with at least one of tin (Sn) or zirconium (Zr).

In this example, the withstand voltage layer 140 may include dielectric ceramic grains similar to that of the dielectric layer 110. The withstand voltage layer 140 may have a size of each of the grains 141 of the dielectric ceramic grains, smaller than a size of the dielectric layer 110, to have a volume fraction of grain boundary in each of the withstand voltage layers 140, greater than a volume fraction of grain boundary in the dielectric layer 110. Since ion mobility of oxygen vacancy at the grain boundary is relatively lower than ion mobility of oxygen vacancy in each of the grains 111 and 141, it is possible to prevent oxygen vacancy from moving into and/or to an outside of the dielectric layer during the manufacturing process. In this case, whether each of the dielectric ceramic particles of the withstand voltage layer 140 contain Ba, Ti, Sn, and Zr and an amount thereof may be determined when scanning of each of Ba, Ti, Sn, and Zr is performed in an interfacial region between each of the internal electrode layers 121 and 122 and the dielectric layer 110 in the thickness direction, in the X-Z cross-section in the length direction (X)-thickness direction (Z), taken from the central portion in the width direction (Y). In addition, whether the region has a structure in which portion of titanium of barium titanate is substituted with Sn and/or Zr may be determined by X-Ray Diffraction (XRD).

The withstand voltage layer 140 applied to the present embodiment, for example, may be prepared by printing a conductive paste for forming an internal electrode layer including ceramic powder and conductive powder on a dielectric green sheet for forming a dielectric layer, stacking the dielectric green sheet in plural to prepare a stack body, and sintering the stack body. In this case, a portion of the ceramic powder included in the conductive paste may remain in the internal electrode layers 121 and 122 to form the aforementioned ceramic particles (C), and a portion of the ceramic powder included in the conductive paste may diffuse into the dielectric layer 110 to form the withstand voltage layer 140. In the ceramic powder, a portion of titanium (Ti) of barium titanate (BaTiO$_3$) including barium (Ba) and titanium (Ti) may be substituted with at least one of tin (Sn) or zirconium (Zr). As a non-limiting example, the ceramic powder may be a powder having a so-called core-shell structure including a core of barium titanate and a shell including tin (Sn) and/or zirconium (Zr). In this case, in the shell, at least a portion of titanium of barium titanate may be substituted with tin (Sn) and/or zirconium (Zr). As another expression, the ceramic powder having such a core-shell structure may be expressed as a structure in which a barium titanate is doped with tin (Sn) and/or zirconium (Zr).

The external electrodes 210 and 220 may be disposed on the body 100, and may be connected to the internal electrode layers 121 and 122. As illustrated in FIGS. 1 and 2, the external electrodes 210 and 220 may be respectively disposed on the third and fourth surfaces 103 and 104 of the body 100, to include first and second external electrodes 210 and 220 respectively connected to the first and second internal electrode layers 121 and 122.

The first and second external electrodes 210 and 220 may include first and second connection portions respectively disposed on the third and fourth surfaces 103 and 104 of the body 100 and respectively connected to the first and second internal electrode layers 121 and 122, and first and second extension portions respectively extending from the first and second connection portions to the first surface 101 of the body 100. The first and second extension portions may be disposed on the first surface 101 of the body 100 to be spaced apart from each other. The first and second extension portions may extend not only on the first surface 101 of the body 100, but also on the second, fifth and sixth surfaces 102, 105, and 106 of the body 100, but the scope of the present disclosure is not limited thereto. For example, as illustrated in FIG. 1, each of the external electrodes 210 and 220 of the present disclosure may be of a normal type formed on five (5) surfaces of the body 100, but is not limited thereto, and may be an L-type formed on two (2) surfaces of the body 100, a C-type formed on three (3) surfaces of the body 100, or the like.

The external electrodes 210 and 220 may be formed of any material as long as they have electrical conductivity, such as metal, and specific materials thereof may be determined in consideration of electrical characteristics, structural stability, and the like, and, furthermore, may have a multilayer structure. For example, each of the external electrodes 210 and 220 may include a first layer and a second layer, and the first layer may be formed by sintering a sintered conductive paste including a conductive metal and glass, may be formed by curing a curable conductive paste including a conductive metal and a base resin, or may be formed by vapor deposition. The second layer may be a nickel (Ni) plating layer and a tin (Sn) plating layer, sequentially formed on the first layer, by a plating method.

In the present embodiment, although a structure in which the capacitor component 1000 has two external electrodes 210 and 220 is described, the number, a shape, or the like of respective external electrodes 210 and 220 may be changed according to a shape, or the like of respective internal electrode layers 121 and 122, or other purpose.

A capacitor component according to an aspect of the present disclosure may secure reliability even when a dielectric layer becomes thin.

While example embodiments have been illustrated and described above, it will be apparent to those skilled in the art that modifications and variations could be made without departing from the scope of the present disclosure as defined by the appended claims.

What is claimed is:

1. A capacitor component comprising:
    a body including a dielectric layer and a plurality of internal electrode layers alternately disposed with each other, with the dielectric layer interposed therebetween; and
    an external electrode disposed on the body and connected to the plurality of internal electrode layers,
    wherein the dielectric layer has a central region, an upper region disposed above the central region and having a thickness of 10 or more to 30 nm or less in a direction from a boundary with the internal electrode layers to the central region, and a lower region disposed below the central region, and
    wherein ionic mobility of the upper region of the dielectric layer is lower than ionic mobility of the central region of the dielectric layer.

2. The capacitor component of claim 1, wherein the upper region of the dielectric layer comprises at least one of Zn and In.

3. The capacitor component of claim 2, wherein the at least one of Zn and In in the upper region of the dielectric layer is contained in an amount of 1 at % or more and 10 at % or less.

4. The capacitor component of claim 1, wherein the dielectric layer comprises dielectric ceramic particles,
wherein an average size of dielectric ceramic particles in the upper region of the dielectric layer is smaller than an average size of dielectric ceramic particles in the central region of the dielectric layer.

5. The capacitor component of claim 4, wherein the average size of the dielectric ceramic particles in the upper region of the dielectric layer is 20% or more and 50% or less, compared to the average size of the dielectric ceramic particles in the central region of the dielectric layer.

6. The capacitor component of claim 4, wherein the dielectric layer comprises dielectric ceramic particles including barium (Ba) and titanium (Ti), and
the upper region of the dielectric layer comprises dielectric ceramic particles in which at least a portion of titanium (Ti) is substituted with at least one of tin (Sn) and zirconium (Zr).

7. The capacitor component of claim 6, wherein ceramic particles are disposed in the plurality of internal electrode layers,
wherein the ceramic particles of the plurality of internal electrode layers comprise at least one of tin (Sn) and zirconium (Zr).

8. The capacitor component of claim 7, wherein the ceramic particles of the plurality of internal electrode layers further comprise barium (Ba) and titanium (Ti).

9. The capacitor component of claim 8, wherein an average thickness of the central region of the dielectric layer is 380 nm or less.

10. The capacitor component of claim 1, wherein the upper region of the dielectric layer is disposed between the dielectric layer and at least one of the plurality of internal electrode layers.

11. A method of manufacturing a capacitor component comprising:
forming a dielectric green sheet;
forming at least one of ZnO and $In_2O_3$ on one surface of the dielectric green sheet by sputtering; and
applying a conductive paste to the dielectric green sheet.

12. The method of claim 11, further comprising:
providing the dielectric green sheet to which the conductive paste is applied as a plurality of dielectric green sheets, and stacking the plurality of dielectric green sheets, to form a stack body; and
sintering the stack body to form a body including a dielectric layer and an internal electrode layer.

13. A method of manufacturing a capacitor component comprising:
forming a dielectric green sheet having dielectric ceramic particles including barium (Ba) and titanium (Ti);
applying a conductive paste including conductive powder and ceramic particles including barium (Ba) and titanium (Ti) to the dielectric green sheet;
providing the dielectric green sheet to which the conductive paste is applied as a plurality of dielectric green sheets, and stacking the plurality of dielectric green sheets, to form a stack body; and
sintering the stack body to form a body including a dielectric layer and an internal electrode layer,
wherein the ceramic particles have a composition in which at least a portion of titanium (Ti) is substituted with at least one of tin (Sn) and zirconium (Zr), and
wherein the dielectric layer has a central region, an upper region disposed above the central region and having a thickness of 10 or more to 30 nm or less in a direction from a boundary with the internal electrode layer to the central region.

14. A capacitor component comprising:
a body including a dielectric layer and a plurality of internal electrode layers alternately disposed with each other, with the dielectric layer interposed therebetween; and
an external electrode disposed on the body and connected to the plurality of internal electrode layers,
wherein the dielectric layer has a first region and a second region, the second region disposed between the first region and at least one of the plurality of internal electrode layers, and the second region extends from the at least one of the plurality of internal electrode layers by 10 or more to 30 nm or less in a direction from a boundary with the internal electrode layers to the first region,
wherein the second region of the dielectric layer comprises at least one of Zn and In, and
wherein ionic mobility of the second region of the dielectric layer is lower than ionic mobility of the first region of the dielectric layer.

15. The capacitor component of claim 14, wherein the at least one of Zn and In in the second region of the dielectric layer is contained in an amount of 1 at % or more and 10 at % or less.

16. The capacitor component of claim 14, wherein the second region of the dielectric layer comprises at least one of ZnO and $In_2O_3$.

17. A capacitor component comprising:
a body including a dielectric layer and a plurality of internal electrode layers alternately disposed with each other, with the dielectric layer interposed therebetween; and
an external electrode disposed on the body and connected to the plurality of internal electrode layers,
wherein the dielectric layer has a first region and a second region, the second region disposed between the first region and at least one of the plurality of internal electrode layers, and the second region extends from the at least one of the plurality of internal electrode layers by 10 or more to 30 nm or less in a direction from a boundary with the internal electrode layers to the first region,
wherein the second region of the dielectric layer comprises dielectric ceramic particles in which at least a portion of titanium (Ti) is substituted with at least one of tin (Sn) and zirconium (Zr), and
wherein ionic mobility of the second region of the dielectric layer is lower than ionic mobility of the first region of the dielectric layer.

18. The capacitor component of claim 17, wherein the first region of the dielectric layer comprises dielectric ceramic particles, and an average size of the dielectric ceramic particles in the second region of the dielectric layer is smaller than an average size of the dielectric ceramic particles in the first region of the dielectric layer.

19. The capacitor component of claim 18, wherein the average size of the dielectric ceramic particles in the second region of the dielectric layer is 20% or more and 50% or less, compared to the average size of the dielectric ceramic particles in the first region of the dielectric layer.

20. The capacitor component of claim 17, wherein ceramic particles are disposed in the plurality of internal electrode layers, and wherein the ceramic particles of the plurality of internal electrode layers comprise at least one of tin (Sn) and zirconium (Zr).

* * * * *